Jan. 23, 1934.  A. E. YOUNG  1,944,587
HEAT MEASURING APPARATUS
Filed May 4, 1932  4 Sheets-Sheet 2
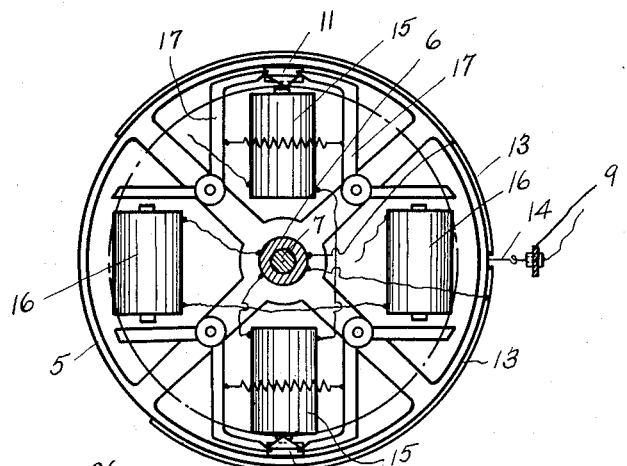
Fig. II
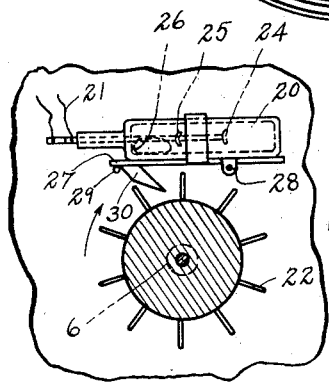
Fig. III
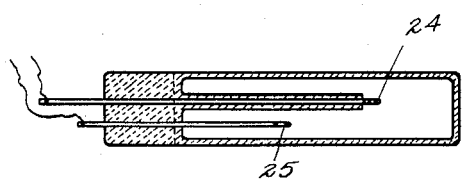
Fig. IV
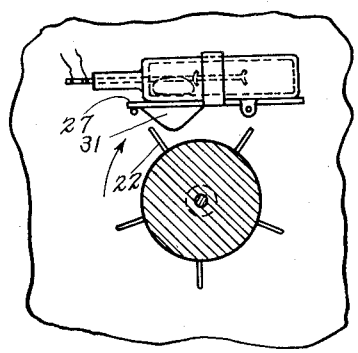
Fig. V
INVENTOR
Archer E. Young
by Christy Christy and Wharton
his attorneys Jan. 23, 1934. A. E. YOUNG 1,944,587
HEAT MEASURING APPARATUS
Filed May 4, 1932 4 Sheets-Sheet 3
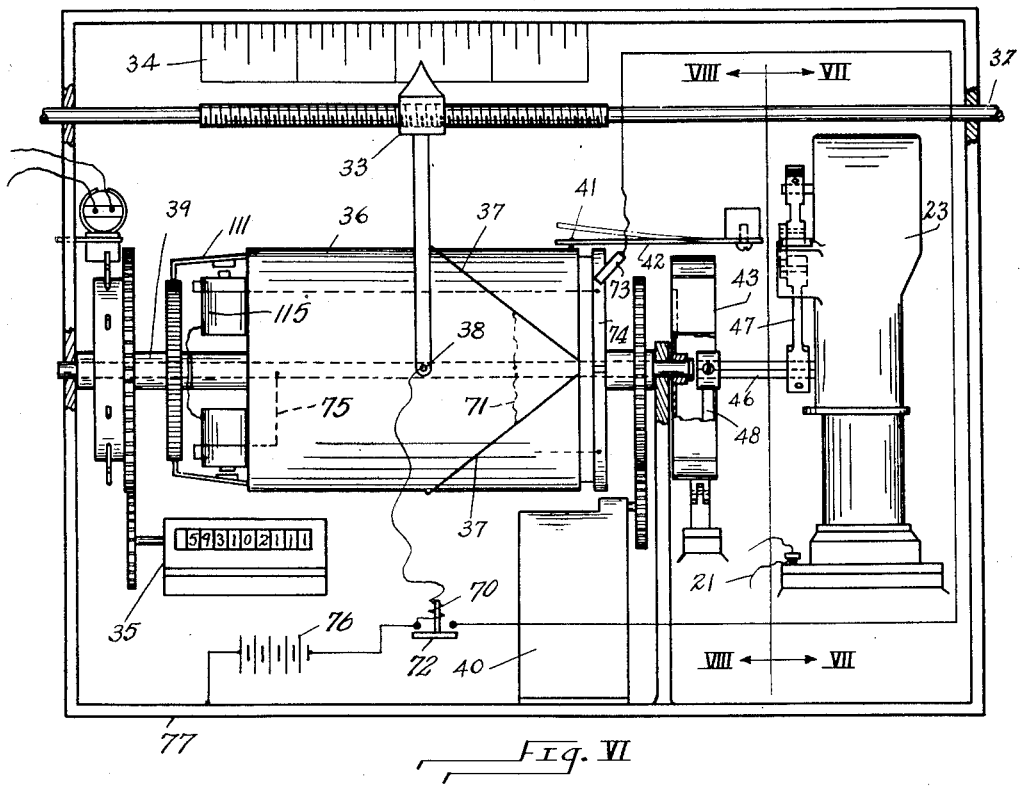
Fig. VI
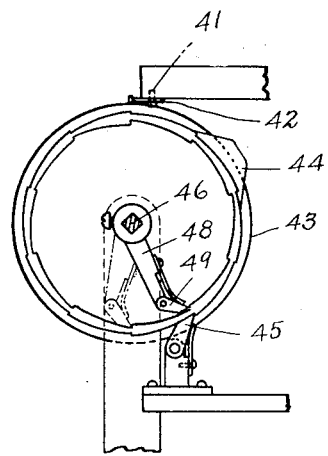
Fig. VIII
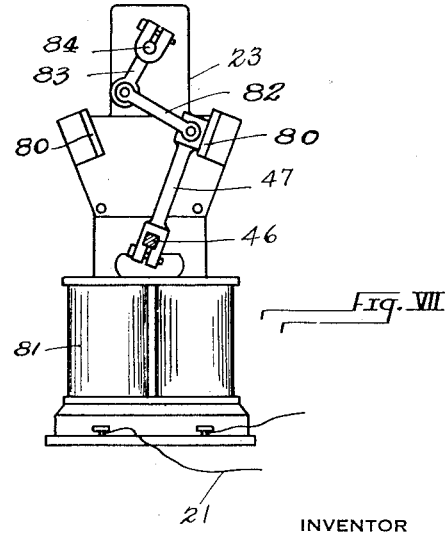
Fig. VII
INVENTOR
Archer E. Young
by Christy, Christy and Wharton
his attorneys Jan. 23, 1934.     A. E. YOUNG     1,944,587
HEAT MEASURING APPARATUS
Filed May 4, 1932     4 Sheets-Sheet 4
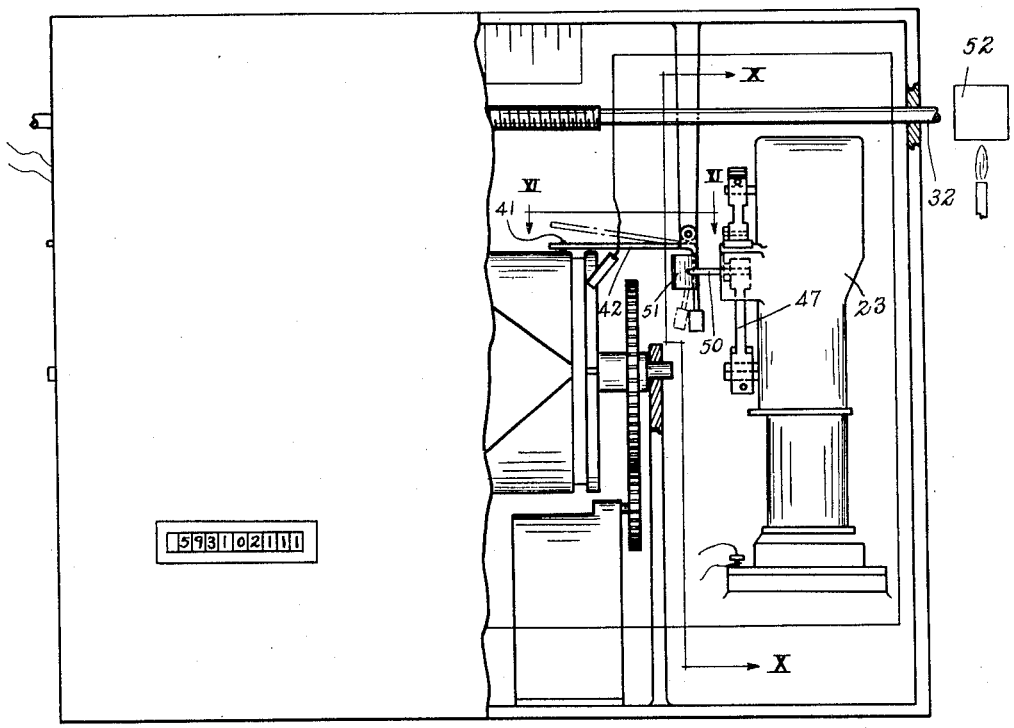
Fig. IX
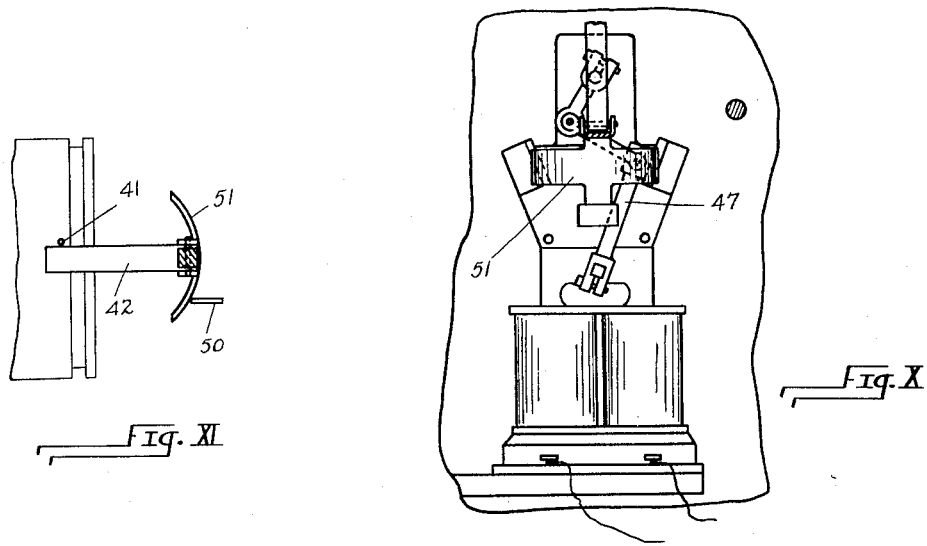
Fig. XI     Fig. X
INVENTOR
Archer E. Young
by Christy Christy and Wharton
his attorneys Patented Jan. 23, 1934

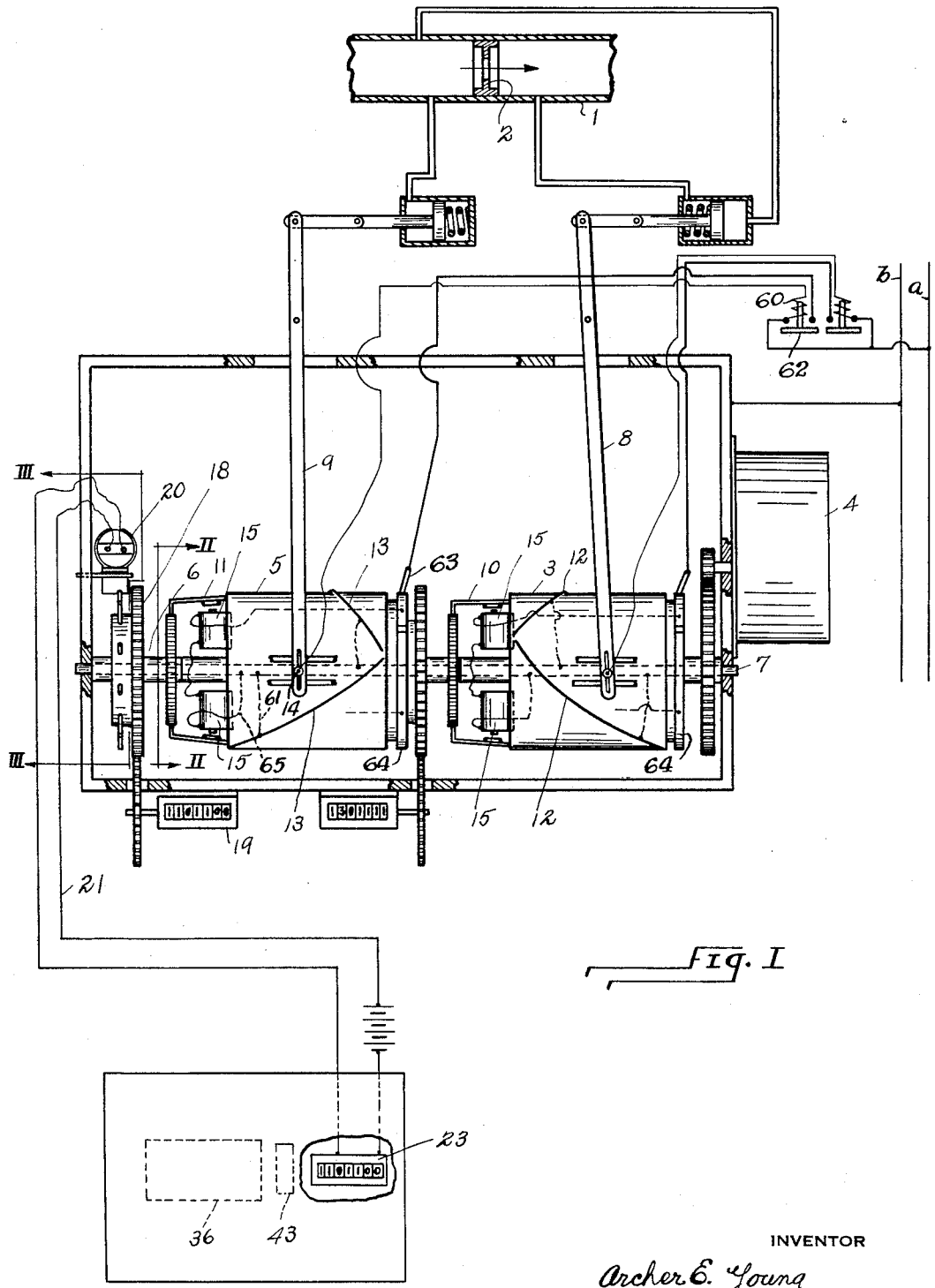

1,944,587

UNITED STATES PATENT OFFICE 1,944,587

HEAT MEASURING APPARATUS

Archer E. Young, Pittsburgh, Pa.

Application May 4, 1932. Serial No. 609,070

9 Claims. (Cl. 73—184)

This invention relates to the measurement of heat units in a stream of gas flowing in a conduit, and consists of means combined with a calorimeter, whereby a member responsive to variation in the quantity of gas flowing in the conduit may be made responsive to the movement of the calorimeter as well, to the end that, under varying conditions of flow, the instrument will afford with accuracy indication of the number of heat units delivered.

In the accompanying drawings Fig. I is a view, showing in plan (the casing broken away) measuring apparatus adapted to afford reading of the quantity of gas flowing in a main, with correction for variations in pressure, and, associated with such measuring apparatus, Fig. I shows, diagrammatically, a portion of the apparatus whereby in the practice of the invention variations in the heat value of the gas may be integrated with variations in pressure; Figs. II and III are fragmentary views in vertical section, in the planes indicated at II—II and III—III, respectively, Fig. I; Fig. IV is a view to larger scale, showing in longitudinal and horizontal section a detail which in Fig. III appears in side elevation; Fig. V is a view corresponding to Fig. III, in which a variation in detail is shown; Fig. VI is a view in plan (the casing broken away) showing a portion of a calorimeter, and, in combination with it, the means whereby the integration of variables is effected and a reading is obtained with simultaneous correction for variations in pressure and in heat value; Figs. VII and VIII are fragmentary views in vertical section, as indicated at VII—VII and VIII—VIII, Fig. VI; Fig. IX is a view in plan of an instrument from which the casing is less completely broken away, an instrument which, in comparison with that of Fig. VI, is characterized by variation in detail; Fig. X is a fragmentary view in vertical section, on the plane indicated at X—X, Fig. IX; Fig. XI is a fragmentary view in horizontal section, on the plane XI—XI, Fig. IX.

But for its association with certain diagrammatically indicated parts, the instrument of Fig. I is the instrument of Letters Patent of the United States, No. 1,865,996, granted me July 5, 1932, and application for Letters Patent of the United States Serial No. 618,161, filed June 20, 1932. In this figure a conduit for gas is diagrammatically indicated at 1, and in the conduit an orificed plate 2. The direction of flow is indicated by an arrow. In association with the conduit with its orificed plate, three coaxially mounted, independently rotatable, members are provided. Of these the member 3 is a cylinder and it is constantly rotated at uniform speed by a suitable motor, in this instance the clockwork 4. The second rotatable member, the member 5, is also a cylinder; and the third is the member 6. These three independently rotatable members 3, 5, and 6 may conveniently be mounted, hub-like, upon a common axle 7. In association with cylinder 3 an arm 8 is provided which swings adjacent to and in a plane approximately tangent to the cylinder, and the arm in its swinging is responsive to variation in the differential pressure across the orifice in plate 2 of the stream of gas flowing in conduit 1; similarly an arm 9, responsive in its swinging to variations in static pressure, is associated with cylinder 5. Between the cylinder 3 and the cylinder 5 is a clutch which includes radially swinging arms 10 which are borne by cylinder 3, and between the cylinder 5 and the member 6 is a clutch which includes radially swinging arms 11 which are borne by cylinder 5. The swinging of the clutch arms is subject to electric control. The two cylinders are equipped each with a co-axially arranged and integrally rotating disc 64 upon the periphery of which two segregated arcs of conducting material are insulated with a pair of longitudinally extending and circumferentially diverging electric contact pieces in the form of the strips 12, 12 and 13, 13; and the two arms 8 and 9 are provided with brushes (14, Fig. II); and, by the cooperation of brushes with contact pieces, circuits are, as the cylinders rotate, momentarily closed and broken again through suitable electric lines. The operating circuits may be traced in Figs. I and II. Let it be understood that cylinder 5 is turning in counter-clockwise direction, as viewed from the right, Fig. I. On contact with brush 14 of that strip 13, which in Fig. I appears in position below the brush, two circuits are successively closed: first, a relay circuit from branch $a$ of a power line, through the coil 60 of a relay, the brush 14, strip 13, and lead 61, to branch $b$ of the power line; then, on the closure of the relay switch 62, from branch $a$, through brush 63, one of the conducting arcs upon disc 64, the electro-magnets 15 (which are connected in series), and lead 65, to the branch $b$. This second circuit, once completed, effects magnetically the swinging of arms 11 against spring tension from normally inactive positions to the positions of clutch closure which are shown in Fig. I. In such positions the clutch arms are immediately locked by the spring-backed latches 17 which spring to place behind them. The energizing circuit, the making of which has been described, is immediately broken again by the continued rotation of cylinder 5 and the advance of strip 13 from contact with brush 14. On the breaking of this contact the relay switch then immediately opens and the relay circuit also is broken. In the further rotation of cylinder 5 the second strip 13 makes contact with brush 14. Thereupon the same two circuits are successively closed, with this difference: that, in consequence of the changed position of disc 64, the brush 63 being now in contact with the other of the two arcs with which disc 64 is equipped, it is the electro-magnets 16 that are momentarily energized. These magnets, when energized, effect the swing of latches 17, against spring tension, from latching to releasing positions; and at once the clutch arms 11 swing under spring tension to release positions again. The member 6 carries a gear wheel 18, which in known manner drives a tally 19.

It will be perceived that, cylinder 3 being constantly driven at uniform rate, cylinder 5 will in any given interval of time turn through a range of turning which is great or less, according to variation in the differential pressure of the gas stream; and that in the same interval the member 6 will turn through a range which is great or less, according to variation in the summation or joint effect of variations in both differential and static pressures. And it will be perceived that it needs but proper proportioning of parts to cause the tally 19 to afford reading of the volume of gas flowing, corrected both with respect to differential and with respect to static pressures.

Fig. I shows also a make-and-brake device 20 arranged in an electric line 21. This make-and-break device is operated in response to rotation of member 6 by means of arms 22 which extend radially from member 6. The arms are in this instance ten in number (the number may be determined at will) and, correspondingly, with each rotation of member 6 a circuit through line 21 will be made and broken again ten times. A magnetically operated tally 23 is included in the line 21. The tally 23 with its magnetic operation is illustrated in Figs. VI and VII. A shaft 46 mounted in a suitable casing carries an arm 47. The casing is provided with two stops 80, 80, between which the arm 47 may swing, which stops limit the range of turning of the shaft 46. A spring (not shown) tends always to turn the shaft 46 in one direction, and an electro-magnet 81, when energized, is effective to turn the shaft in opposite direction, against the tension of the spring. So long as the magnet continues deenergized, the spring holds the arm against one stop (for example, the stop on the right, Fig. VII). The energizing of the magnet 81 causes the shaft to turn in counter-clockwise direction until the arm 47 engages the stop 80 on the left. A stirrup 82 connects the arm 47 with an arm 83 which is borne on a shaft 84, and the shaft 84 constitutes the operating shaft of the tally itself, to which the numeral 23 is immediately applied. By such construction, it will be perceived, the tally may be advanced one interval for each energizing of magnet 81; that is to say, for each step in the step-by-step rotation of member 6 (Fig. I). By proper proportioning of parts, the reading of tally 23 may be made to correspond to that of tally 19, with the minor qualification that whereas tally 19 is responsive minutely to the turning of member 6, tally 23 is responsive step by step, to each tenth of a revolution accomplished by member 6. The tally 23 may be located where one will, near to or far from the installation which includes the cylinders 3 and 5 and the tally 19. For the purposes of my present invention, it is associated with a calorimeter.

The make-and-break device 20 of Fig. III is essentially that of my application, Serial No. 618,161, named above. A tube of glass, to which the numeral 20 is immediately applied, contains sealed within it two pole pieces with vertically enlarged heads 24 and 25. The stem of the longer pole piece is sheathed in glass. Within the tube is contained also a globule 26 of mercury. The tube is mounted upon a carrier 27, pivoted at 28 and resting normally by gravity upon a stop 29. In normal position the carrier rests on the stop and then the tube is inclined downwardly to the left (Fig. III) and the globule of mercury rests at the left-hand end of the tube. As the member 6 turns, the arms 22, engaging one by one a suitable abutment 30 formed upon carrier 27, raise the carrier, turning it in clockwise direction (Fig. III), and then, releasing it, allow it to fall to normal position again. The raising is relatively slow, the descent fast, and the tube is so shaped and the globule of mercury of such size that on the slow clockwise swing the globule completes the circuit by engaging simultaneously the two pole pieces 24 and 25, but on the rapid counter-clockwise swing, the globule, more widely spread, fails to make contact.

In Fig. V an alternative arrangement is shown. The abutment 31 is so particularly shaped that the arm 22 engages it not only to raise the carrier 27 also to allow it gradually to sink again. In this case the globule of mercury will make contact on both upward and downward swings, and, accordingly, in this case the member 6 is shown to be equipped with but half the number of arms 22 which in the first case are found, and manifestly with the same effect in the operation of the magnetic tally.

A calorimeter is a known instrument, adapted to be installed in association with a gas conduit. The flame is maintained by a small flow of gas, bled from the stream in the conduit, and variation of the heat value of the flame is caused to express itself in the turning of a shaft. In the meter as ordinarily constructed, the turning shaft carries a pen-arm and traces a line on a record sheet which is caused to advance at constant speed in a direction transverse to that of the swing of the pen.

Referring to Fig. VI, the shaft 32 may be understood to be the shaft of a calorimeter, which in its turning in one direction or the other is indicative of change in the heat value of the flame. (In Fig. IX the calorimeter is diagrammatically indicated at 52.) Upon this shaft an index finger 33 in the form of a nut is threaded. The nut 33 being properly restrained from rotation, its displacement longitudinally upon shaft 32 will be indicative of the turning of the shaft. The nut, being arranged in association with a fixed scale 34, serves to indicate momentarily the heat value of the flame. And manifestly, if the nut were equipped with a pen and in place of the scale 34 a traveling chart were provided, a record might be had indicative of the quantity of B. t. u.'s delivered—on the assumption that pressure conditions are constant. So much the art has known.

The present invention consists in associating with the rotary shaft 32 of a calorimeter, and the nut 33 traveling thereon, a tally 35, a member movable in accordance with the flow of gas in a conduit (with correction for variation in conditions of pressure), and means for causing the movable member to drive the tally and to drive it intermittently, and during a greater or less portion of succeeding units of movement of the movable member, according to the position of the nut 33 upon the shaft 32. The movable member conveniently takes the form of a rotatable cylinder 36, in parallelism with which and adjacent to which the shaft 32 extends; and means are provided for causing the aggregate range of cylinder rotation during prolonged intervals of time to be an expression of the integration of the two variables, differential pressure and static pressure of the stream of gas flowing in the conduit: a function, that is to say, of the range of rotation of member 6.

Ordinarily and preferably the calorimeter will be installed at a station remote from the line, and remote from the associated rotary members 3, 5, and 6 of Fig. I; and, accordingly, the cylinder 36 is immediately associated, not with the member 6 (though, manifestly, such an association is entirely practicable), but rather with the magnetic tally 23; and, for every predetermined unit of quantity of gas metered by the magnetic tally 23 (say one thousand feet), the cylinder 36 is caused to move through one complete rotation. Like cylinders 3 and 5, cylinder 36 carries co-axially and integrally a disc 74 bearing, insulated upon its periphery, two isolated arcs of conducting material; the cylinder bears additionally divergent electric-contact strips 37. Nut 33 carries a brush whose position is indicated at 38, which as the cylinder rotates makes successive contact with the strips 37.

Coaxially mounted with cylinder 36 is an independently rotatable member 39, and member 39 drives tally 35, just as member 6 already described, drives tally 19. Clutch mechanism is arranged between cylinder 36 and member 39 substantially such as that already described, between cylinder 5 and member 6. With a duplication in mind of the parts shown in Fig. II, the operating circuits may be traced in Fig. VI. Let it be understood that cylinder 36 is turning in counter-clockwise direction, as viewed from the right, Fig. VI. On contact with brush 38 of that strip 37 which in Fig. VI appears in position below the brush, two circuits are successively closed: first, a relay circuit from a source 76 of electric energy, through the coil 70 of a relay, brush 38, strip 37, and lead 71, to "ground"—that is to say, to the casing 77 of the instrument, in which casing the source 76 also is grounded. The energizing of the coil of the relay effects the closure of the relay switch 72, whereupon the second circuit is closed, from the source 76 through brush 73, one of the conducting arcs upon disc 74, the electro-magnets 115, and lead 75, casing 77, and so to the source 76 again. This circuit, being completed, effects magnetically the swinging of arms 111, against spring tension, from inactive to the clutch-engaging positions shown in Fig. VI. In such positions the clutch arms are immediately locked by the spring-backed latches, duplicates of the latches 17 of Fig. II, that come to place behind them. The circuits last described are immediately broken again by the continued rotation of cylinder 36 and the advance of strip 37 from contact with brush 38. The relay 72 then immediately opens again. In the further rotation of cylinder 36 the second strip 37 comes to contact with the brush 38. Thereupon the same two circuits are successively closed, with this difference: that, in consequence of the changed position of disc 74, and the contact of brush 73 with the other of the two arcs with which disc 74 is equipped, it is the latch-swinging electro-magnets (corresponding to magnets 16 of Fig. II) that are momentarily energized. These, as in the case first described, when energized, effect the release of the clutch arms 111, and at once the clutch arms swing under spring tension to release positions again. Accordingly, with each rotation of cylinder 36 tally 35 moves and indicates a value which is great or less, according to the position of nut 33 upon shaft 32; that is to say, according to the instant heat value of the gas.

Associated with cylinder 36 is clockwork 40 for driving it, and an escapement is provided consisting of a pin 41 projecting radially from the cylinder and a stop 42 movable to and from a position in which the pin engages it; and this escapement is operated by the magnetic tally 23 at intervals corresponding with the tally operation—for example, every time a thousand feet are added to the tally reading, the escapement acts.

Referring particularly to Fig. VI a drum 43 is mounted for rotation coaxially with cylinder 36. This drum carries upon its surface a block 44 adapted in the course of each rotation of the drum to raise the stop 42 and to allow it to descend again. The drum 43 is held against retrograde turning (clockwise, Fig. VIII) by means of the spring-backed pawl 45 which engages external ratchet teeth on the drum; it is turned forward by the operation of the magnetic tally 23. The shaft 46 of the tally is arranged coaxial with drum 43; and with every impulse imparted to the tally arm 47 shaft 46 is turned. An arm 48 extending from shaft 46 carries a spring-backed pawl 49, and this pawl, engaging ratchet teeth on the interior of drum 43, effects the counter-clockwise turning of the drum.

Explanation has been given that with each tenth of a rotation of member 6 the magnetic tally 23 receives a driving impulse; and if the interior ratchet formed upon drum 43 be, as it is shown to be, a ratchet of ten teeth to the circumference, it is manifest that, by proper proportioning of parts to the throw of the magnetic tally, the escapement may be made to act once with each rotation of member 6. The escapement acts in the swinging of stop 42 upward by engagement with it of abutment 44. When the stop 42 so swings, cylinder 36 is free and turns in response to the drive of clockwork 40. In the course of rotation of cylinder 36 drum 43 has completed its tenth of a revolution, abutment 44 has passed beyond engagement with stop 42, and stop 42 has resumed its normal position. Then on the completion of one complete revolution of drum 36 further turning is prevented by the abutment of the pin upon the stop.

In the somewhat different arrangement shown in Figs. IX—XI, the operative arm 47 of the magnetic tally 23 is at its distal end equipped with an outstanding pin 50. The stop 42 is pivoted and counter weighted, so as to rest normally in position to be engaged by pin 41. The stop is further provided with a bell-crank arm having an extended cylindrical surface 51 upon which the pin 50 bears as the arm 47 swings. The arrangement is such that with each swing of arm 47 the escapement acts: stop 42 is momentarily swung aside and immediately allowed to resume normal position; and this with the result and effect already indicated.

With attention centered upon Fig. VI (IX), it will be perceived that the tally 23 may be made to afford indication of the volume of flow in standard cubic foot units, with correction for variation in pressure; that upon scale 34 may be read the B. t. u's. per cubic feet from moment to moment; and that tally 35 may be made to indicate the total number of heat units delivered by the flowing stream. Under preexisting practice, it has been necessary to calculate from the reading upon scale 34 and the reading of tally 23 the actual number of heat units delivered. In the use of the apparatus described, the tally 35, operated automatically at regular and brief intervals (the interval at which the swings of arm 47 succeed one another) which may be two or three minutes, indicates that which otherwise must be calculated, namely, the number of heat units delivered. As indicated above, the apparatus may be so proportioned and organized that the cylinder 36 will make one complete revolution each time the tally 23 registers a thousand cubic feet of gas. And, accordingly, the effective space between strips 37, 37, measured circumferentially of cylinder 36, the space, namely, defined by the instant position of the movable member 33, will be the multiplier by which the uniform figure 1000 is multiplied in the periodic advances of the tally 35.

I claim as my invention:

1. In gas measuring apparatus and in combination with a conduit, a member movable in a given interval of time through a range great or less, according to the quantity of gas flowing through the conduit, a calorimeter including a second member movable in response to variation in the heat value of the gas flowing in the conduit, an integrating mechanism including a third movable member, and means controlled by the second member for imparting movement from the first member to the third, such means being effective during a greater or less portion of such interval of time, according to the simultaneous position of the second member.

2. In gas measuring apparatus and in combination with a conduit, a movable member in whose range of movement during a given interval of time the static and differential pressures of a stream of gas in said conduit are integrated, a calorimeter including a second member movable in response to variation in the heat value of the gas flowing in the conduit, an integrating mechanism including a third movable member, and means subject to the control of the second movable member for imparting movement from the first movable member to the third, such means being effective during a greater or less portion of such interval of time, according to the simultaneous position of the second member.

3. In gas-measuring apparatus the combination of a conduit, a movable member, means for integrating in the motion of the said member the variables of static and differential pressures of a stream of gas flowing in such main, a calorimeter including a second movable member, and means for integrating in the motion of such second movable member the result of the first integration, as expressed in the movement of the first-named member, and the variable of the heat value of the gas flowing in the said conduit.

4. In gas measuring apparatus the combination with a conduit, of a member which in the course of a prolonged interval of time moves through an interval of travel which is great or less, according to the quantity of gas flowing in the conduit, a calorimeter including a member movable in response to variation in the heat value of the gas flowing in the conduit, an integrating mechanism including a third movable member, means for establishing driving connection between the movable member first named and the third movable member, such means including the movable member of the calorimeter and such means being effective during a fraction of a unit of travel of the movable member first named, the fraction being great or less according to the position of the movable member of the calorimeter.

5. In gas-measuring apparatus the combination with a conduit, of a rotary member which in the course of a prolonged interval of time turns through a range which is great or less, according to the quantity of gas flowing in the conduit, a second rotary member axially aligned with the first, movable means for alternately uniting the second rotary member with the first and releasing it therefrom, a calorimeter including a member movable in response to variation in the heat value of the gas flowing in the conduit, a control for said uniting means including co-operating members borne by the rotary member first named and by the movable member of the calorimeter, whereby the said uniting means are rendered effective during a fraction of a rotation of the rotary member first named, the fraction being great or less according to the position of the movable member of the calorimeter.

6. In gas-measuring apparatus the combination with a conduit and an orificed plate arranged in the conduit of a movable member, means for causing the member to move through an interval of travel which in a prolonged interval of time is great or less, according to variations in the static and differential pressures of a stream of gas flowing in the main and through the orifice in the plate arranged in the main, a second movable member, a calorimeter including a member movable in response to variation in the heat value of gas flowing in the conduit, means for alternately uniting the second movable member with the first and releasing it from such union, electric control for the said uniting means, the movable member first named and the movable member of the calorimeter being provided with the co-operating parts of a make-and-break device forming part of the electric control for said uniting means, the said co-operating parts being so proportioned and arranged that the said uniting means are effective during a fraction of a unit of movement of the movable member first named, the fraction being great or less according to the instant position of the movable member of the calorimeter.

7. In gas-measuring apparatus and in combination with a conduit, a member which in a given interval of time moves through a range which is great or less, according to the quantity of gas flowing in the conduit, a magnetic tally having a make-and-break device included in its operating circuit, said make-and-break device being subject to the movement of the movable member first named, a second member movable in accord with movement of the magnetic tally, a third movable member and means for intermittently connecting said third movable member with the second, an electric control for said connecting means, a calorimeter including a member which moves in response to variation in heat value of gas flowing in the conduit, said second movable member and said movable member of the calorimeter being provided with co-operating parts of an electrical make-and-break device forming part of such electric control, the parts being so proportioned and arranged that the said connecting means are effective during a greater or less portion of a unit of movement of the second movable member, according to the position of the movable member of the calorimeter.

8. In gas-measuring apparatus the combination of a conduit, a member rotatable in accord with the quantity of gas flowing in the conduit, a second rotary member, means for rotating said second rotatable member, an escapement for said rotating means, subject to the operation of the rotatable member first named, a third rotatable member, means for uniting the third rotatable member intermittently with the second, an electric control for such uniting means, a calorimeter including a member movable in response to variation in the heat value of gas flowing in the conduit, the said electric control including co-operating contact members borne by the said second rotatable member and the movable member of the calorimeter and so proportioned and arranged that the said uniting means are effective, as the second rotatable member rotates, through a fraction of a rotation great or less, according to the instant position of the movable member of the calorimeter.

9. In apparatus for measuring gas, a conduit, a magnetic tally, means for operating said tally step by step through a range which in a given interval of time is great or less, according to the quantity of gas flowing in the conduit, a rotatable member together with rotating means and an escapement therefor, said escapement being operable by the magnetic tally at regularly recurrent intervals in the course of movement of said magnetic tally, the parts being so arranged that with each operation of the escapement the rotatable member is driven through one complete rotation, a member movable in response to variation in the heat value of the gas flowing in the conduit, a second rotatable member, means for imparting rotation from the first rotatable member to the second, and means subject to the control of the member responsive to heat value for rendering the said rotation-imparting means effective through a fraction of a rotation of the first rotatable member, a fraction which is great or less, according to the position of the member responsive to heat value.

ARCHER E. YOUNG.